3,014,845
PRODUCTION OF 6-AMINOPENICILLANIC ACID

George Newbolt Rolinson, Parkgate House, Newdigate, England; Merfyn Richards, Flat 1, Brockham Park, Betchworth, England; and Frank Ralph Batchelor, The Flat, Gatton Manor, Ockley, England
No Drawing. Filed Jan. 25, 1960, Ser. No. 4,229
4 Claims. (Cl. 195—36)

This invention relates to chemical processes for the production of substances having antibiotic activity and which are useful in the preparation of novel penicillins and, more particularly, relates to an improvement in processes for the production of 6-aminopenicillanic acid by the enzymatic degradation of certain penicillins.

Various processes for the production and recovery of 6-aminopenicillanic acid, which has the following structural formula (I)
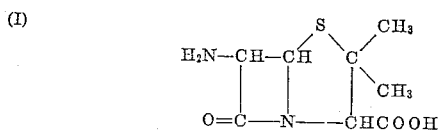

are described in Belgian Patent No. 569,728 and in the scientific literature, particularly in a publication by Batchelor et al. in Nature 183, pages 257–258 (1959). In such processes a penicillin-producing mould is grown in a nutrient medium and the 6-aminopenicillanic acid or salt thereof is isolated from the fermentation liquor obtained.

It has recently become known that 6-aminopenicillanic acid can be used to produce infinite numbers of novel penicillins by its reaction with acylating agents such as acid chlorides and acid anhydrides. Many such novel penicillins have already exhibited potent antibacterial activity and some have given promise of surprising attributes such as enhanced activity against resistant organisms and resistance to destruction by acid and by penicillinase. Known methods of producing 6-aminopenicillanic acid are very difficult to execute, particularly in a commercially feasible manner in which the economical production of large quantities of the product is required. The synthetic production of 6-aminopenicillanic acid on a practical commercial scale has yet to be achieved.

Prior workers in the art have suggested that a penicillin product in a fermentation medium is not a stable product but rather is in a state of dynamic equilibrium with other penicillin products present in the fermentation medium (Wideburg and Peterson Abstract of Papers of Am. Chem. Soc., 132nd meeting, September 8–13, 1957). Other workers (Sakaguchi et al. cited below) suggested that penicillin G could be enzymatically hydrolyzed to produce "pencilin," a compound for which the structure of 6-aminopenicillanic acid was suggested. 6-aminopenicillanic acid, however, was either not obtained by any of these workers or was obtained in such impure form and minute quantities that it could not be characterized.

It is therefore an object of the present invention to provide an improved process for producing 6-aminopenicillanic acid. It is a particular object of the present invention to provide a process for producing 6-aminopenicillanic acid by the enzymatic degradation of certain penicillins.

We have now found that certain penicillins can be converted to 6-aminopenicillanic acid by means of an enzyme or mixture of enzymes referred to herein as "penicillin amidase." Accordingly, there is provided by the present invention a process for the preparation of 6-aminopenicillanic acid and salts thereof which comprises treating a penicillin with a penicillin amidase, said penicillin being selected from the group consisting of the penicillins having the formula (II)
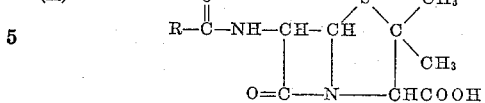

wherein R is a member selected from the group consisting of alkyl groups having from 1 to 10 carbon atoms inclusive, and alkenyl groups having from 3 to 10 carbon atoms inclusive.

The term "alkyl" as used herein means both branched and straight chain saturated aliphatic hydrocarbon radicals having from 1 to 10 carbon atoms inclusive and include such illustrative alkyl groups as methyl, ethyl, n-propyl, isopropyl, isobutyl, n-butyl, t-butyl, amyl, hexyl, decyl, etc. The term "alkenyl" means both straight and branched chain unsaturated aliphatic hydrocarbon radicals having from 2 to 10 carbon atoms, such as, for example, allyl, 2-methylallyl, $\Delta^8$-nonenylallyl, etc.

The penicillins of Formula II above which are preferred for use as substrates in the process of the present invention include a mixture of the natural penicillins produced by a typical fermentation process in which no precursor is used. Such a natural mixture will include n-heptyl penicillin (penicillin K), 2-pentenyl penicillin (penicillin F), n-amyl penicillin (dihydro-penicillin F) and 3-penicillin (flavicin) as well as some benzylmethyl penicillin (penicillin G) and p-hydroxybenzylmethyl penicillin (penicillin X). Each of the penicillins of Formula II can be used in the form of their salts with a cation which will not interfere with the enzymatic hydrolysis; the most common of such salts are the alkaline earth metal and alkali metal salts such as the sodium, calcium and potassium salts.

One penicillin amidase, i.e., one enzyme preparation which may be employed in the process of the present invention, is a known enzyme or mixture of enzymes, the preparation of which in the form of a solid and active aqueous solution is described by Kinichiro Sakaguchi and Sawao Murao in J. Agr. Chem. Soc. Japan, 23, page 411 (1950). [See also C.A. 45, 1197 (1951), and in greater detail by Sawao Murao in J. Agr. Chem. Soc. Japan, 29, pages 400–407 (1955), which is available in the English language from the Special Libraries Association, Translation Center, the John Crerar Library, Chicago, Illinois. See also abstract in C.A., 51, 8160 g. (1957).] In their preparation of pencillin amidase, both Sakaguchi and Murao used *Penicillium chrysogenum* Q176, a culture which has been widely used in the penicillin industry. [See the paper entitled "Separation and Identification of Penicillin Species in Commercial Penicillin (Q-176 Culture)" presented by C. J. Salivar et al. at the Conference on Antibiotic Research, Washington, D.C., January 31 and February 1, 1947, and United States Patents No. 2,479,296 and No. 2,562,407.] A preferred culture, a strain of *Streptomyces lavendulae*, employed in the preparation of penicillin amidase is on deposit in the American Type Culture Collection at Washington, D.C., wherein it is identified as A.T.C.C. No. 13664. Another deposited culture, A.T.C.C. No. 13665, generally produces less pigment than A.T.T.C. No. 13664 and can also be employed to produce penicillin amidase.

We have also found that the fungi *Botrytis cinerea* and *Penicillium chrysogenum* as well as certain other fungi of the genera Alternaria, Aspergillus, Epicoccum, Fusarium, Mucor, Penicillium, Phoma, and Trichoderma, the yeasts *Cryptococcus albidus* and a species of Trichosporon, and several Actinomycetes of the genus Streptomyces produce penicillin amidase. Penicillin amidase can be produced from penicillin amidase-producing microorganisms of the genus Streptomyces by the following general procedure which is also illustrated by the specific procedure set forth in greater detail below.

A suitable enzyme preparation for the process of the present invention can be obtained by the following general procedure. First generation slopes on nutrient agar are first prepared from a soil stock of spores of a penicillin amidase-producing microorganism of the genus Streptomyces. After inoculation permitting suitable growth and sporulation to take place, these first generation slopes form the inoculum for the second generation slopes of the same culture medium. Adequately sporulated second generation slopes are washed with sterile water and the resulting suspension of spores aseptically transferred to the seed vessel containing nutrient broth. When this fermentation has run for from 24 to 48 hours the brew is transferred to a larger batch of nutrient broth. After agitation and aeration for a period of 2 to 4 days the mycelium is removed to leave a clear fermentation liquor containing penicillin amidase. The enzyme can be precipitated if desired, with 90% saturation ammonium sulfate.

In another procedure, which is described in detail in Example 4 below, penicillin amidase is prepared by the fermentation of a culture of Botrytis cinerea. In general in this procedure a suitable enzyme preparation may be obtained by using a culture of the organism to inoculate a seed vessel containing a suitable seed culture medium. A penicillin is added aseptically to the seed medium at inoculation. The seed stage is allowed to grow for 24–48 hours after which the whole brew becomes the inoculum for the final fermentation. A portion of the seed is inoculated into a larger batch of growth medium. A penicillin is also added aseptically to the growth medium at inoculation. These additions of penicillin are made to promote formation of the penicillin amidase enzyme. After allowing the final fermentation to run for a period of time a quantity of the penicillin is added for conversion to 6-aminopenicillanic acid. The pH at which the reaction is carried out depends on the particular organism used. At the end of the reaction time the liquid is separated from the organism and any solid residues of the culture medium and the 6-aminopenicillanic acid may be recovered from the aqueous solution.

In experiments relating to the stability of penicillin amidase in a clarified fermentation broth at various pH's, it is found that after five hours storage at room temperature at pH 3, 4, 7, 9, 10, and 11, the enzymatic activity remaining in the broth is 2, 24, 85, 87, 100 and 96 percent, respectively, of the original enzymatic activity. In analogous experiments also relating to the stability of penicillin amidase in clarified fermentation broth at various temperatures, it is found that after 24 hours' storage at −20°, 5°, 18°, 35°, 45°, and 60° C., the enzymatic activity remaining in the broth is 100, 90, 76, 67, 51, and 14 percent, respectively, of the original enzymatic activity.

The reaction between the penicillin and the enzyme preparation can take place by adding the penicillin to the brew or, preferably, by adding a solution of the penicillin to the dialyzed enzyme. The dialyzed enzyme is prepared by treating the clarified liquor containing the enzyme with ammonium sulphate, removing the precipitate which is formed and redissolving it in water and subsequently dialyzing it against running tap water.

The optimum pH for the enzymatic hydrolysis of penicillins in the production of 6-aminopenicillanic acid is about 9.0. Higher and lower pH's are operable, however, and we have found that penicillin amidase is about 75% effective at pH 7.5 and 11.0 (based on effectiveness in enzymatic hydrolysis at pH 9.0). As the enzyme reaction mixture becomes more alkaline than pH 11 or more acid than pH 7.5, the productivity of the process decreases rapidly. Below pH 6.0 the enzyme is almost completely inactive. We prefer to carry out the enzymatic hydrolysis of the various penicillin substrates at a temperature of from about 26 to 50° C. though somewhat higher and lower temperature, e.g., of the range of about 25 to 60° C., can be employed. In most instances the hydrolysis is completed in from about 2 to about 5 hours though in some instances, as in Example 3 below, the penicillin is subjected to enzymatic hydrolysis for a longer period. The course of the reaction may be followed by various assay procedures in order to determine the completion of the hydrolysis reaction.

After the completion of the enzymatic hydrolysis, the unreacted penicillins and the aliphatic carboxylic acid which is split off during the reaction are removed by extraction with an organic solvent, e.g., butyl acetate, at an acid pH. Further purification may be effected by neutralizing the aqueous solution and precipitating impurities by adding a solvent such as acetone, methanol, or ethanol and then centrifuging to remove the precipitated impurities. The clarified solution, with or without prior concentration, is adjusted to a pH of about 6.5 to about 7 and passed over an ion exchange resin to adsorb the product. We prefer to use a column of a highly basic anion exchange resin, in the chloride form, of the cross-linked polystyrene type with quaternary ammonium functional groups, such as Dowex I and DeAcedite FF, both of which are commercially available. A cross-linked polystyrene cationic exchange resin with sulfonic acid functional groups such as Amberlite IR 120 can also be used. In the absorption step we prefer to use about 4 kg. of resin per 15 liters of solution containing from 40 to 60 gm. of 6-aminopenicillanic acid. Elution of the product from the resin is accomplished by the addition of hydrochloric acid, e.g., 0.05 N HCl. Procedures for the recovery of 6-aminopenicillanic acid from aqueous solutions are also illustrated in Belgian Patent No. 569,728.

A preferred method of preparation of the enzyme which is employed in the process of this invention is as follows:

PREPARATION OF PENICILLIN AMIDASE

A culture of Streptomyces ATCC No. 13664 is grown in shaken flasks, 10 liter and 90 liter fermenters using a medium consisting of a broth at a concentration of 20 g. per liter and pH 7.3 to 7.4. The broth is of the following composition:

| Ingredient | Percent |
|---|---|
| Liquid glucose | 3.0 |
| Soya bean meal | 2.5 |
| Yeast extract (Difco) | 0.5 |
| Sodium chloride | 0.5 |
| Calcium carbonate | 0.2 | the first four ingredients being mixed together, the pH adjusted to 6.8 and the calcium carbonate then added. A seed stage is used by growing the microorganism in this medium for 30 hours at about 27° C. with stirring and air flow as in a penicillin fermentation and using approximately 7% by volume of this growth to inoculate the final fermentation. This final fermentation is allowed to run for 96 hours at 26 to 28° C. with stirring and aeration, the mycelium is then removed by filtration (or by centrifugation, if desired) and the clear liquor which contained the enzyme is treated with ammonium sulphate to give 90% saturation (650 g./l.). The precipitate is then removed by centrifuging and redissolved in a small volume of water and dialyzed against running tap water for two days. This enzyme preparation is then freeze dried. Alternatively, the aqueous enzyme preparation can be stored at −20° C.

A fermentation media composed of—

| Ingredient: | Grams per ml. |
|---|---|
| Soya bean meal | 40 |
| Cornmeal | 40 |
| $(NH_4)_2SO_4$ | 1 |
| $CaCO_3$ | 10 | is also useful in the production of penicillin amidase and is used in place of that set forth above in this procedure; this media is preferably adjusted to pH 7.2 to 7.4 before autoclaving.

The following specific examples will serve to illustrate the process of the present invention.

EXAMPLE 1

*Production of 6-aminopenicillanic acid from penicillins V, K, G, and n-butyl penicillin, and a mixture of natural penicillins*

In order to illustrate the comparative activity of penicillin amidase on penicillin V, penicillin K, n-butyl penicillin and a mixture of natural penicillins as compared with penicillin G, the following procedure is adopted.

The penicillins or mixture of penicillins being compared are each dissolved separately in 0.5 N aqueous sodium bicarbonate solution to give solutions of 10 mg./ml. and the pH of each solution is adjusted to 8.7. One ml. of each such solution is then treated with 1 ml. of the enzyme solution (prepared as described above) as a pH of 8.7 and the mixture is incubated at 34° C. in a water bath for 30 minutes. At the end of this time a sample of each mixture is spotted on chromatography tape (Whatman No. 4) and run for 3 to 4 hours in a butanol/ethanol/water, 4:1:5, system to separate the uncovered penicillin. Tapes are also spotted with concentrations of standards of 6-aminopenicillanic acid and similarly treated. After chromatography the tapes are sprayed with phenylacetyl chloride and sodium bicarbonate (producing benzylpenicillin (and are placed on agar plates seeded with spores of *Bacillus subtilis* and incubated at 37° C. for development of zones of inhibition. The 6-aminopenicillanic acid produced from each of the penicillins is then estimated against the standards in the conventional bioassay manner. The results are expressed below in Tables I and II as units/ml. of 6-aminopenicillanic acid produced in the mixture of enzyme and substrate.

TABLE I

| Penicillin K (n-heptyl) | Penicillin V | Penicillin G |
|---|---|---|
| 50 | 30 | 1 |

TABLE II

| Mixture of Natural penicillins | n-butyl Penicillin | Penicillin V | Penicillin G |
|---|---|---|---|
| 163 | 53 | 180 | 10 |

From the foregoing Table I it can be seen that there is produced from penicillin K about 50 times the quantity of 6-aminopenicillanic acid that is produced from penicillin G under like conditions. Similarly, it can readily be seen from Table II above that there is produced from a natural mixture of penicillins over 16 times the quantity of 6-aminopenicillanic acid that is produced under like conditions from penicillin G.

EXAMPLE 2

*Production of crystalline 6-aminopenicillanic acid*

To 700 ml. of the dialysed penicillin amidase prepared as described above is added 15 g. of n-heptyl penicillin (penicillin K) dissolved in 50 ml. of water to give a final concentration of 20 mg./ml. The mixture is incubated at 34° C., the pH being maintained at 8.7 by the periodic addition of aqueous N caustic soda solution. After 9 hours the reaction mixture is adjusted to pH 2 with phosphoric acid and the precipitate which is formed is removed by centrifugation. The liquid is then extracted with a half volume of butyl acetate to remove the residual n-heptyl penicillin together with the n-heptoic acid side chain which is split off during the formation of the 6-aminopenicillanic acid. After neutralization with dilute aqueous caustic soda solution, the resulting solution is percolated through a column of a highly basic anion exchange resin (in the chloride form) of the cross-linked polystyrene type with quaternary ammonium functional groups (e.g., Dowex I) and eluted, concentrated and crystallized to yield solid 6-aminopenicillanic acid.

The foregoing process is repeated using n-butyl penicillin, 2-pentyl penicillin, n-amyl penicillin and 3-pentenyl penicillin and solid 6-aminopenicillanic acid is obtained.

EXAMPLE 3

*Preparation of 6-aminopenicillanic acid from a mixture of natural penicillins*

A fermentation broth containing penicillin amidase is prepared as set forth above and the mycelium is removed by centrifugation. One volume of acetone is then added with stirring to the clarified broth and the resulting precipitate, penicillin amidase, is then collected by centrifugation. The precipitated penicillin amidase is then dissolved in water to give a volume equivalent to one-third of the original broth and the resulting solution of the enzyme is then adjusted to pH 8.5 and to 45° C. A mixture of natural penicillins is then added to the solution to a concentration of 10 gm./liter. The solution is maintained at pH 8.5 and 45° C. until assay shows no further increase in the 6-aminopenicillanic acid content. The unreacted penicillins and the acids which are produced by the enzymatic hydrolysis are then removed by solvent extraction with butyl acetate at pH 2. After the solvent extraction the reaction mixture is cooled to 15–20° C. and the pH is adjusted to 4.5 with phosphoric acid and centrifuged to remove impurities. The clear solution is then adjusted to a pH with the range of 6.5 to 7.0 and the 6-aminopenicillanic acid collected on an ion exchange column containing a highly basic anion exchange resin (in the chloride form) of the cross-linked polystyrene type with quaternary ammonium functional groups (e.g. Dowex 1) in an amount equal to 4 kg. of the resin per 15 liters of clarified reaction mixture containing 40–60 gm. of 6-aminopenicillanic acid and eluted with 0.05 N hydrochloric acid.

EXAMPLE 4

In another method for producing a fermentation liquor containing useful quantities of penicillin amidase and using such penicillin amidase to produce 6-aminopenicillanic acid, a culture of *Botrytis cinerea* B.R.L. No. 36, which is on deposit with the American Type Culture Collection and is identified as ATTC No. 13742, is grown in shaken flasks using a culture medium made from 50 grams maize meal and 1 gram ammonium sulfate in one liter of tap water; the medium is adjusted to pH 6.8 before sterilizing. A seed stage is employed in which the organism is grown for about thirty hours at 26° C. in a culture medium consisting of 80 ml. corn steep liquor and 40 grams glucose made up to 1 liter with tap water, the medium being adjusted to pH 6.4 before sterilizing.

Approximately 7% by volume of the seed stage fermentation is inoculated into the growth medium. An alkyl penicillin is added aseptically to the seed stage fermentation and to the growth medium at inoculation in a total amount equal to about from 250 to 2500 units/ml. in the final growth medium in order to promote the formation of penicillin amidase. This final fermentation is allowed to run for from about 120 to 144 hours at which time the concentration of penicillin amidase in the broth is at about the maximum and penicillins may be added to the broth for conversion to 6-aminopenicillanic acid.

In order to illustrate the activity of the enzyme using the substrates of the present invention compared with penicillin G, penicillins as set forth in the table below are separately added aseptically in sterile solution to a *Botrytis cinerea* fermentation broth of 120–144 hours age which is prepared as described above. A convenient final concentration of penicillin in the broth is 5,000 units/ml.

After a further 24 hours fermentation, samples of each broth are separated from their mycelial and solid content and measured volumes of each sample placed on chromatography tape for comparative bioassay as in Example 1.

The results are expressed below in Table III as units/ml. of 6-aminopenicillanic acid produced in the mixture of enzyme and substrate.

TABLE III

| Penicillin K | Mixture of natural penicillins | Penicillin G |
|---|---|---|
| 470 | 250 | 48 |

We claim:
1. A process for the preparation of an aqueous solution of 6-aminopenicillanic acid which comprises in sequence (1) growing a culture of *Streptomyces lavendulae* in a suitable liquid nutrient growth medium for a period of 2 to 6 days whereby fermentation broth is produced, (2) separating the major portion of the solid materials from said fermentation broth, (3) mixing n-heptyl penicillin with said fermentation broth to form an aqueous reaction mixture and (4) maintaining said aqueous reaction mixture at a temperature from about 25 to 60° C. at a pH of from about 6 to 11 for a period of from about 2 to about 24 hours.

2. A process for the preparation of an aqueous solution of 6-aminopenicillanic acid which comprises in sequence (1) growing a culture of *Botrytis cinerea* in a suitable liquid nutrient growth medium for a period of 2 to 6 days whereby a fermentation broth is produced, (2) mixing n-heptyl penicillin with said fermentation broth to form an aqueous reaction mixture and (3) maintaining said aqueous reaction mixture at a temperature from about 25 to 60° C. at a pH of from about 6 to 11 for a period of from about 2 to about 24 hours.

3. A process for the preparation of an aqueous solution of 6-aminopenicillanic acid which comprises in sequence (1) growing a culture of *Streptomyces lavendulae* in a suitable liquid nutrient growth medium for a period of 2 to 6 days whereby fermentation broth is produced, (2) separating the major portion of the solid materials from said fermentation broth, (3) mixing a penicillin substrate with said fermentation broth to form an aqueous reaction mixture and (4) maintaining said aqueous reaction mixture at a temperature from about 25 to 60° C. at a pH of from about 6 to 11 for a period of from about 2 to about 24 hours, said penicillin substrate being selected from the group consisting of the penicillins having the formula

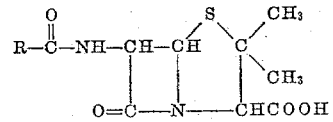

wherein R is a member selected from the group consisting of alkyl groups having from 1 to 10 carbon atoms inclusive and alkenyl groups having from 3 to 10 carbon atoms inclusive.

4. A process for the preparation of an aqueous solution of 6-aminopenicillanic acid which comprises (1) growing a culture of *Botrytis cinerea* in a suitable liquid nutrient growth medium for a period of 2 to 6 days whereby a fermentation broth is produced, (2) mixing a penicillin substrate with said fermentation broth to form an aqueous reaction mixture, (3) maintaining said aqueous reaction mixture at a temperature from about 25 to 60° C. at a pH of from about 6 to 11 for a period of from about 2 to about 24 hours and (4) recovering 6-aminopenicillanic acid from said aqueous reaction mixture, said penicillin substrate being selected from the group consisting of the penicillins having the formula

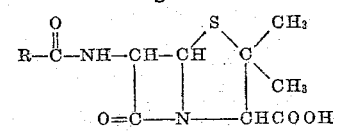

wherein R is a member selected from the group consisting of alkyl groups having from 1 to 10 carbon atoms inclusive and alkenyl groups having from 3 to 10 carbon atoms inclusive.

References Cited in the file of this patent

J. Agr. Chem. Soc. Japan, 23, page 41 (1950).
Nature 183, pages 257–258, January 24, 1959.

UNITED STATES PATENT OFFICE
CERTIFICATE OF CORRECTION

Patent No. 3,014,845                          December 26, 1961

George Newbolt Rolinson et al.

It is hereby certified that error appears in the above numbered patent requiring correction and that the said Letters Patent should read as corrected below.

In the heading to the printed specification, between lines 7 and 8, insert the following:

Claims priority, application Great Britain Mar. 16, 1959 column 1, line 54, for '"pencilin,"' read -- "penicin," --; column 2, line 23, for "3-penicillin" read -- 3-pentenyl penicillin --; column 5, line 21, for "as" read -- at --; line 26, for "uncovered" read -- unconverted --; column 5, lines 30 and 31, for "benzyl-penicillin (and" read -- benzylpenicillin) and --.

Signed and sealed this 1st day of May 1962.

(SEAL)
Attest:

DAVID L. LADD

Attesting Officer                               Commissioner of Patents